July 1, 1952 R. W. FOREMAN ET AL 2,601,782
APPARATUS FOR MEASURING TACKINESS
Filed Dec. 15, 1949
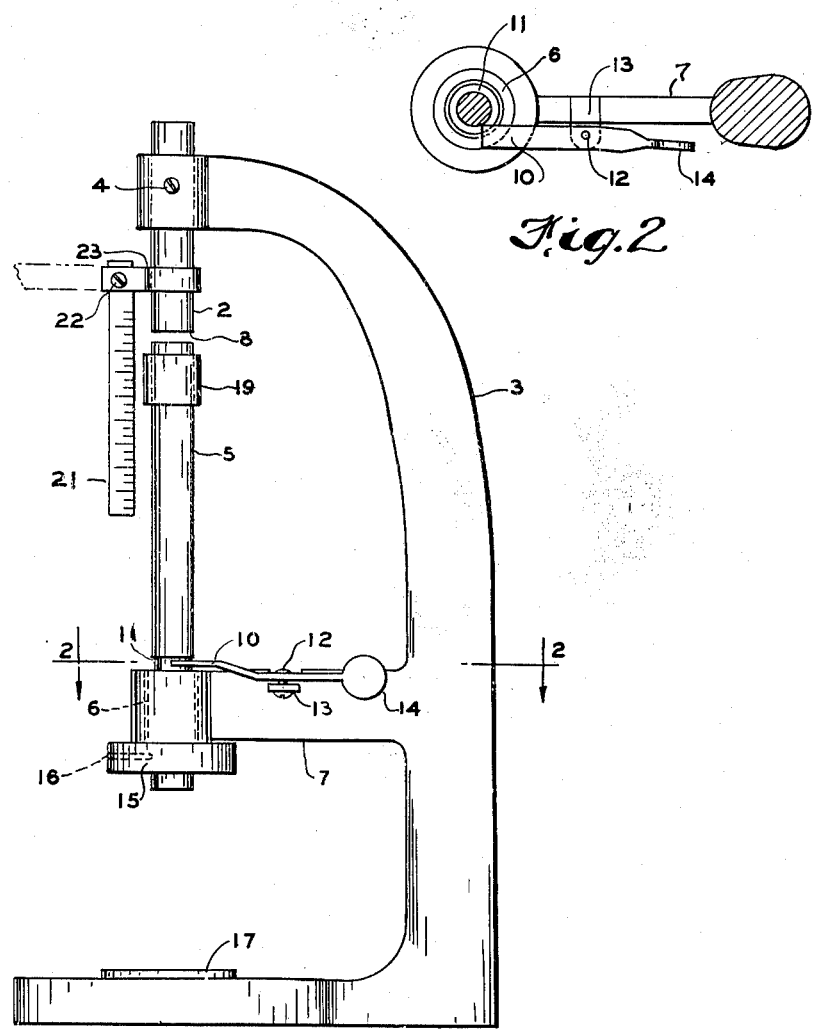
INVENTOR.
ROBERT W. FOREMAN &
FRED H. GUTH
BY
Oberlin & Limbach Patented July 1, 1952

2,601,782

UNITED STATES PATENT OFFICE 2,601,782

APPARATUS FOR MEASURING TACKINESS

Robert W. Foreman and Fred H. Guth, Cleveland, Ohio, assignors to The Standard Oil Company, Cleveland, Ohio, a corporation of Ohio Application December 15, 1949, Serial No. 133,109

4 Claims. (Cl. 73—150)

This invention relates to measurement of materials having the property of tackiness. Tackiness has been defined as the "resistance which must be overcome when separating two solids joined by an adhesive still in its liquid state," Jour. Colloid Science, 2, 163. This property, related to cohesive action, occurs in various materials, such as adhesives, inks on the order of printer's ink, lubricating greases, etc. In such greases, tackiness is of particular importance because it is an indication of how effectively the grease will remain in place on a metal surface to be lubricated, and of how much "channeling" can be expected to occur during use. By the present invention, measurements of tackiness may be readily made, and in terms permitting comparisons of precision character. Other objects and advantages will appear from the following description.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of apparatus in accordance with the invention; and Fig. 2 is a partial transverse section taken on a plane substantially indicated by line 2—2, Fig. 1.

Measurement of the material to be tested is made between opposed parallel surfaces of members which are relatively movable. In the form illustrated in Fig. 1, the member 2 is supported by a suitable stand 3, being secured thereto, as by a set screw 4. Movable with respect to said member 2 is an opposed member 5, the mounting thereof being such as to permit axial reciprocation, such as in a sleeve bearing 6 supported in the bracket arm 7. The opposed members 2 and 5 have plane surfaces 8, and these normally are positioned at a standardized distance apart, for instance two millimeters being a satisfactory spacing. The movable member 5 is held in such position controllably by suitable means, for instance, a catch 10 which engages in a recess 11 in the member 5. Such catch 10 is pivoted as at 12 on a small lug 13 which projects from the bracket arm 7, and to the rear of such pivot point 12 the catch member is angular out of line with its front portion, and terminates in a trigger handle 14. It is thus seen that when the catch member 10 is engaged in the recess or groove 11 of the member 5, the latter is held up in its position opposing the member 2, but if the trigger handle 14 be pressed inwardly, the catch is disengaged, and the member 5 drops by gravity. Conveniently, the members 2 and 5 may be steel rods, and a satisfactory diameter is ½ inch. The weight on the movable member 5 may be standardized by attaching a weight 15, as by a set screw 16. One hundred grams is a satisfactory weight, for example. If desired, a buffer 17 of rubber or other yielding material may be provided under the movable rod 5. Adjustably slidable with respect to the rods 2 and 5 is a sleeve 19 of suitable material. Brass is in general satisfactory, such sleeve functioning to uniformize the charge of material to be tested between the opposed surfaces of the members 2 and 5.

To measure the tackiness of a material, for example a lubricating grease, with the rod 5 in its down position the sleeve 19 is adjusted upwardly on the rod 5 to form a temporary cup thereon. The depth of the cup or receptacle so provided should be greater than the two millimeter dimension between the opposed surfaces when the rod 5 is in its raised position adjacent the rod 2. The receptacle or cup is then filled with the material, at the temperature standardized for the test. Satisfactory temperatures for grease testing are 75° F.±5° F. Other temperatures may be chosen for special purposes with the material filling the cup or receptacle provided by the sleeve 19. The lower rod 5 is then moved up until contact is made between the grease and the upper rod, the lower rod being pressed upwardly sufficiently firmly to assure complete contact of the grease throughout between the opposed metal surfaces, while the sleeve covers the grease and both rod ends. Then the sleeve 19 is moved down onto the lower rod, and the lower rod is moved completely up thereby squeezing out surplus grease, and the catch 10 is set in the recess 11 to hold the lower rod at its standard spacing, two millimeters, from the upper rod. By now moving the sleeve 19 up onto the upper rod, excess grease is trimmed off, and a uniform charge between the opposed faces of the members 2 and 5 is provided. Within a specified time, e. g. ten seconds, the trigger 14 is pressed to release the catch and allow the lower rod 5 to drop freely and pull the grease out into a "neck" or string. The length of the grease string from the lower end of the upper rod to the point of rupture is then measured by means of a scale 21 alongside of the members 2 and 5. For convenience, this scale may be pivoted at 22 to a bracket 23, such pivotal mounting allowing the scale to be swung up out of the way, as indicated by dotted lines, when not being used for reading. Graduation of the scale may satisfactorily be in millimeters. Desirably, three measurements at least may be made, each with a fresh sample, and the average will be taken as the measurement. The longer the neck for drawout to the point of rupture, the greater is the tackiness.

The ratio of the mass of the movable member 5 to the contact area between the members must be sufficiently large to allow overcoming the cohesive forces within the grease by the force (mg.) exerted by the movable member upon release. Other dimensions are not critical within a single apparatus. But dimensions should of course be standardized in order to permit comparison of the results between the devices. Thus, there should be standardization of the following: (1) contact area (or bar diameters); (2) spacing between the bars; (3) mass of the lower bar. The equation involved is:

$$Ft = \frac{3na^2}{4}\left(\frac{1}{h_1^2} - \frac{1}{h_2^2}\right)$$

where

F is the stress applied,
t is the duration of stress application,
n is the viscosity of the adhesive,
a is the radius of the disc-shape test charge,
$h_1$ is the initial thickness thereof, and
$h_2$ is the final thickness.

The factors $h_1$ and F are fixed by instrument dimensions, while t, n, and a vary with the material, and since relative thickness is the measurement which is here concerned, $h_2$, a function of t, n and a, is what is measured for the present purposes.

Other modes of applying the principle of the invention may be employed, change being made as regards the details described, provided the features stated in any of the following claims or the equivalent of such be employed.

We therefore particularly point out and distinctly claim as our invention:

1. In apparatus for measuring tackiness, a support, aligned upper and lower rods carried thereby having adjacent parallel ends adapted to receive a test specimen therebetween, a sleeve slidably adjustable on the adjacent ends of said rods, the upper rod being in fixed position and the other movable, a weight on said movable rod, a scale alongside the movable rod and being secured to the upper rod pivotally for angular movement, there being a recess in the lower portion of said movable rod, and a releasable trigger pivoted to said support and engageable in said recess to normally hold the lower rod up at a predetermined distance from the fixed rod.

2. In apparatus for measuring tackiness, a support, aligned upper and lower members having adjacent parallel surfaces adapted to receive a test specimen therebetween, a sleeve slidably adjustable on both members, said lower member being movable and the other fixed, a weight on said movable member, a scale extending alongside the movable member and being pivotally mounted for angular movement, and a releasable trigger for normally holding the movable member at a predetermined distance from the fixed member.

3. In apparatus for measuring tackiness, a support, aligned upper and lower members having adjacent parallel surfaces adapted to receive a test specimen therebetween, a sleeve adjustably slidable on the adjacent ends of said members, the upper member being fixed and the other movable, a scale alongside the movable member, and a releasable trigger normally holding the movable member at a predetermined distance from the fixed member.

4. In apparatus for measuring tackiness, aligned upper and lower members having adjacent parallel ends, one being in fixed position and the other movable, means including an enclosure movable over said ends for providing a dimensionally standardized charge of material to be tested between said parallel ends, and releasable means including a movable catch for holding said movable member at a standardized distance from the fixed member.

ROBERT W. FOREMAN.
FRED H. GUTH.

REFERENCES CITED

The following references are of record in the file of this patent:

UNITED STATES PATENTS

| Number | Name | Date |
|---|---|---|
| 1,785,521 | Mackin | Dec. 16, 1930 |
| 1,917,597 | Nessler | July 11, 1933 |
| 2,267,561 | Halton | Dec. 23, 1941 |